Nov. 20, 1956  A. L. LE FEBVRE ET AL  2,771,117
GROOVING MACHINE
Filed May 19, 1955

INVENTORS.
Alfred L. LeFevre,
Alvin O. Johnson and
Walter J. Sligh.
By Ross & Ross, Atty.

United States Patent Office 2,771,117
Patented Nov. 20, 1956

2,771,117

GROOVING MACHINE

Alfred L. Le Febvre, Southwick, Alvin O. Johnson, Westfield, and Walter J. Sliz, Easthampton, Mass., assignors to Stanley Home Products, Inc., Westfield, Mass., a corporation of Massachusetts Application May 19, 1955, Serial No. 509,588

3 Claims. (Cl. 153—73)

This invention relates to new and useful improvements in apparatus for grooving tubular members such as handles for mops, brooms and the like.

The principal object of the invention is directed to the provision of apparatus constructed and arranged to form, in an elongated tubular handle, a plurality of longitudinally spaced annular grooves. Such grooving provides hand gripping means as well as ornamentation for the handle.

In a broad way, the novel features of the invention include a rotatable drum having a plurality of grooving rolls rotatable therein and guide means for presenting a tubular handle to the drum for the action of the grooving rolls.

According to the preferred form of the invention, the grooving rolls are journalled in the drum in such a manner that peripherial portions thereof project from the surface of the drum such a distance as will provide grooves in the handle which are of a desired depth.

In accordance with a special feature of the invention, the grooving rolls are journalled in the drum on an axis parallel to the axis of rotation of the drum. The rolls are spaced longitudinally of the drum and the axes of the rolls are disposed relatively angularly circumferentially of the drum or, stated in another way, the rolls are arranged helically on the drum. Thus, rolls for successive grooves along the tubular handle are rotated by the drum successively into contact with the handle whereby adjacent grooves are not simultaneously being formed by adjacent rolls.

The guide means of the apparatus of the invention preferably includes a set of rollers rotatable on circumferentially spaced axes and arranged to receive the tubular handle therebetween so as to guide the handle for rotation relative to the drum and grooving rolls on an axis parallel to that of the drum and cooperating with the drum for the action of the grooving rolls.

All of the above cited objects, I accomplish by means of such structure and relative arrangement of parts thereof, as will fully appear by a perusal of the description below and by various specific features which will be hereinafter set forth.

To these above and other ends, various other and ancillary features and advantages and objects of my invention as will become more readily apparent as the description proceeds, my invention consists in certain features of novelty, in a mode of operation, and in the combination, organization, and arrangement of parts as will be hereinafter more particularly pointed out in the claims hereunto annexed and more fully described and referred to in conjunction with the accompanying drawings wherein:

Figure 1:
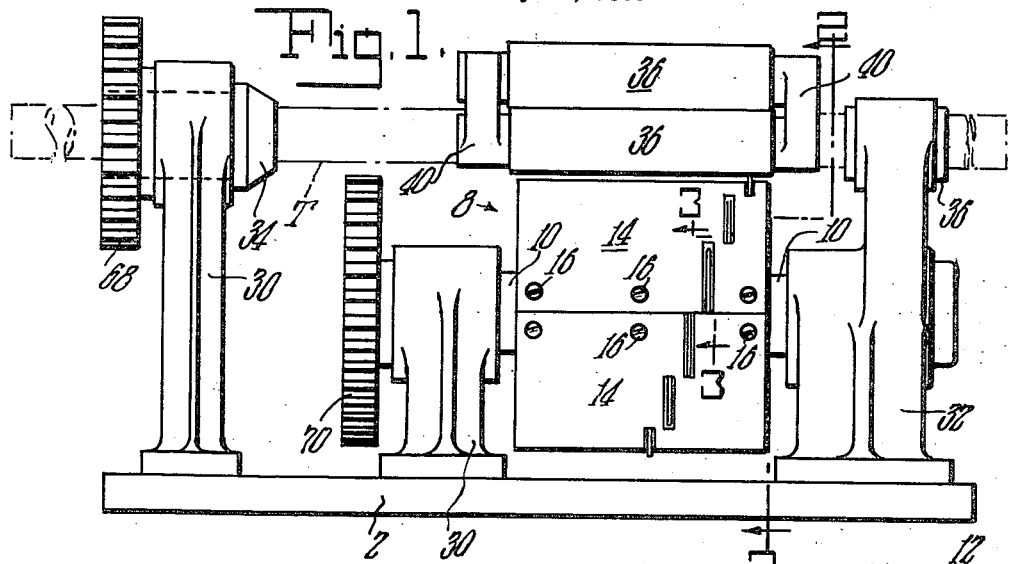
Fig. 1 is a front elevational view of apparatus for grooving tubular articles embodying the novel features of the invention.

In the following description and claims, various details will be identified by specific names for convenience. These names however are intended to be as generic in their application as the art will permit.

Referring now to the drawing more in detail, in which similar characters of reference indicate corresponding parts in the several figures and referring more particularly to the preferred form of my invention selected for illustrative purposes, I have shown a base which is represented by 2 and to which bearings 4 and 6 are secured in a suitable manner and extend upwardly therefrom. A drum is represented by 8 which has a shaft 10 at opposite ends rotatable in the bearings 4 and 6.

The drum 8 has a cylindrical body 12 surrounded by a covering which may include somewhat thin walled cover members 14 fitted and secured thereto by any suitable means, such as screws 16.

The body 12 is provided on the periphery thereof with a plurality of bearing sockets 18 which extend axially of the drum. Circumferential grooves 20 are arranged circumferentially of the drum and transversely of the sockets 18.

Figures 3, 4:
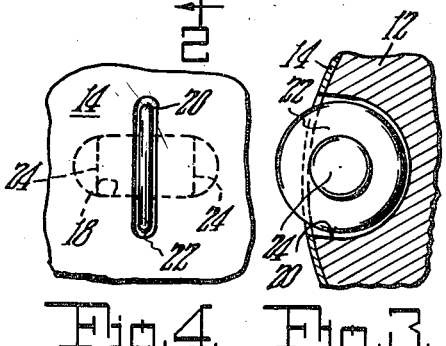
Fig. 3 is a sectional view on the line 3—3 of Fig. 1.
Fig. 4 is a plan view of a portion of the drum of the apparatus showing one of the grooving rolls.
Figure 2:
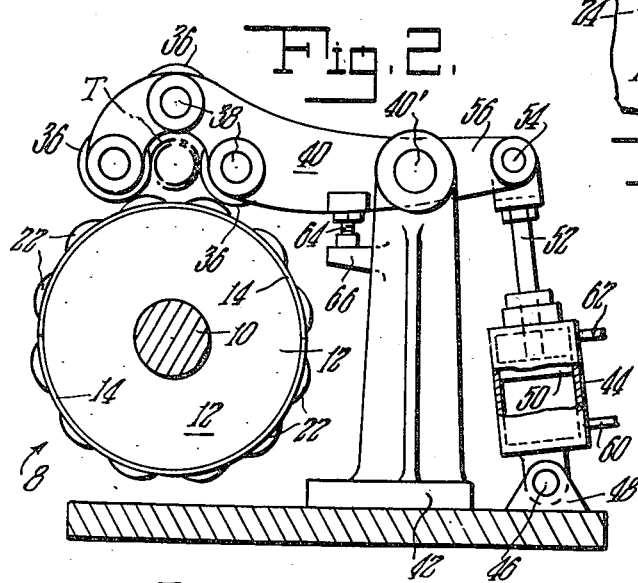
Fig. 2 is an end elevational view of the apparatus shown in Fig. 1.
Figure 5:
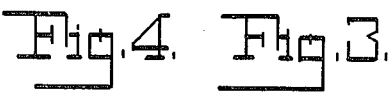
Fig. 5 is a sectional view through a tubular member showing the relation of a grooving roll thereto in groove forming position.

Grooving rolls 22 have journals 24 rotatable in the sockets 18 and the cover members are provided with slots coinciding with the slots 20 so that the peripheries of the rolls 22 extend outwardly of the drum. The cover members 14 hold the journals 24 in the socket, as shown in Fig. 3.

Means is provided for positioning a hollow tubular member such as a handle T for action of the grooving rolls 22. For illustrative purposes bearing stands 30 and 32 secured to and extending upwardly from the base have a chuck 34 and a bushing 36 is rotatable in the stands 30 and 32 respectively. A tubular handle represented in dot-dash lines T is disposed in the chuck and bushing and is gripped by the chuck for rotation of the handle. Other means may be provided for presenting the tube to the drum and rotating said tube.

Means for guiding the tube T is provided and includes a plurality of elongated rolls 36 having end shafts 38 at opposite ends which are rotatable in levers 40 fixed to a shaft 40' in bearings 42 adjacent said levers 40 which are fixed to the base and extend upwardly therefrom. A cylinder 44 is pivoted at 46 to lugs 48 of the base 2 and a piston 50 in the cylinder has a rod 52 connected at 54 to an arm 56 of one of the levers 40.

As pressure is applied at 60 to the cylinder 44 the piston is actuated so that the levers are swung counterclockwise to locate rolls 36 in guiding position for the rotating tube T. The rolls 36 will remain in the guiding position during the grooving of the tube. Subsequent to a grooving operation pressure is released at 60 and applied at 62 to the cylinder so that the levers 40 are swung clockwise.

A stop screw 64 in engagement with a lever 40 is arranged to engage an abutment 66 of one bearing member 42 to limit counterclockwise movement of the levers 40.

Figure 6:
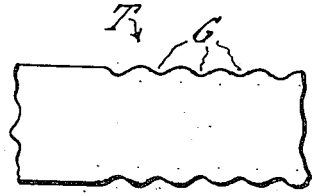
Fig. 6 is an elevational view of a section of a tubular member showing grooves formed by the apparatus.

The parts are arranged so that during grooving of the tube T the rolls guide and back up the tube as the drum rotates so that the grooving rolls displace the wall of the tube as in Fig. 4 and form grooves such as G as in Fig 6.

The tube T is rotated at rather high speed by the chuck 34 for the grooving operation while the drum is rotated at a much slower speed and may be accomplished by connecting member 68 of the chuck 34 and the member 70 of the drum shaft 10 to suitable driving means.

As special features of the invention the tube T for the grooving operation is held for rotation on a fixed axis which is parallel to the axis of rotation of the drum. Means is provided for guiding the tube in its rotation or for backing up the tube as it is being grooved thereby to prevent deflection of said tube.

Other means than shown may be provided for guiding and backing up the tube and may include a slide movable back and forth between operative and inoperative positions which is provided with rolls.

The grooving rolls are arranged on the drum so that they are spaced longitudinally and circumferentially of the drum or are disposed spirally thereof. This is so that the rolls act on the tube successively or so that no great number of rolls and preferably one roll only acts on the tube at a time.

There may be as many grooving rolls along the drum as may be desired and there may be various spacing arrangements. Instead of a single drum there may be a plurality of adjacent drums each provided with grooving rolls.

While I have illustrated and described the invention as embodied in a specific arrangement, I do not intend to be limited to the details shown since various modifications and structural changes may be made without departing in any way from the spirit of the invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalency of the claims below.

What it is desired to claim and secure by Letters Patent of the United States is:

1. Apparatus for forming longitudinally spaced annular grooves along an elongated tubular handle or the like comprising in combination, a support, relatively spaced end brackets and an intermediate bracket extending upwardly from said support, an elongated drum having a shaft rotatable in one of said end brackets and said intermediate bracket and provided on the outer face thereof with a plurality of elongated bearing sockets having longitudinal axes disposed in parallelism with the axis of rotation of said drum, means for rotating said drum, the sockets being spaced helically along said drum and said drum being provided with grooves at opposite transverse sides of the sockets thereof for grooving rolls, relatively thin cover members complemental to the outer surface of said drum and secured thereto and provided with slots in alignment with the socket grooves for grooving rolls, a plurality of grooving rolls in the grooves of said drum and extending through and beyond the slots of said cover members having journals rotatable in said sockets and held therein by said cover members, driving means for rotating a tubular handle adjacent said drum on an axis parallel to that of said drum, and guide means for guiding a handle during rotation thereof.

2. Apparatus set forth in claim 1 wherein said driving means includes, a bushing rotatable in one of said end brackets for receiving a handle and a chuck rotatable in the other of said end brackets for receiving and gripping a handle, said bushing and chuck being rotatable on axes parallel to the axis of rotation of said drum and being disposed for rotation of a handle adjacent said drum for action of said grooving rolls.

3. Apparatus set forth in claim 1 wherein said guide means includes, bearings fixed to and extending upwardly at opposite ends of said drum, an elongated shaft rotatable in said bearings, levers having inner ends adjacent said brackets fixed to and extending outwardly from said shaft with outer free ends over said drum, a plurality of elongated guide rolls having ends journalled in the free ends of said levers for rotation on axes parallel to the axis of rotation of said drum and being adapted to engage opposite sides and a side adjacent thereto of a handle in said chuck and bushing, and means between said support and shaft adapted to urge said shaft and levers in handle engaging direction of the guide rolls thereof.

References Cited in the file of this patent

UNITED STATES PATENTS

| | | |
|---|---|---|
| 601,230 | Billings et al. | Mar. 29, 1898 |
| 1,002,342 | Walsh | Sept. 5, 1911 |
| 2,426,949 | Puster | Sept. 2, 1947 |
| 2,469,426 | Anthony | May 10, 1949 |

FOREIGN PATENTS

| | | |
|---|---|---|
| 825 | Great Britain | 1856 |
| 1,120 | Great Britain | 1887 |